May 14, 1963 G. H. SUDMEIER 3,089,514
TEMPERATURE-STABILIZED PLUMBING SYSTEM
Filed July 12, 1961
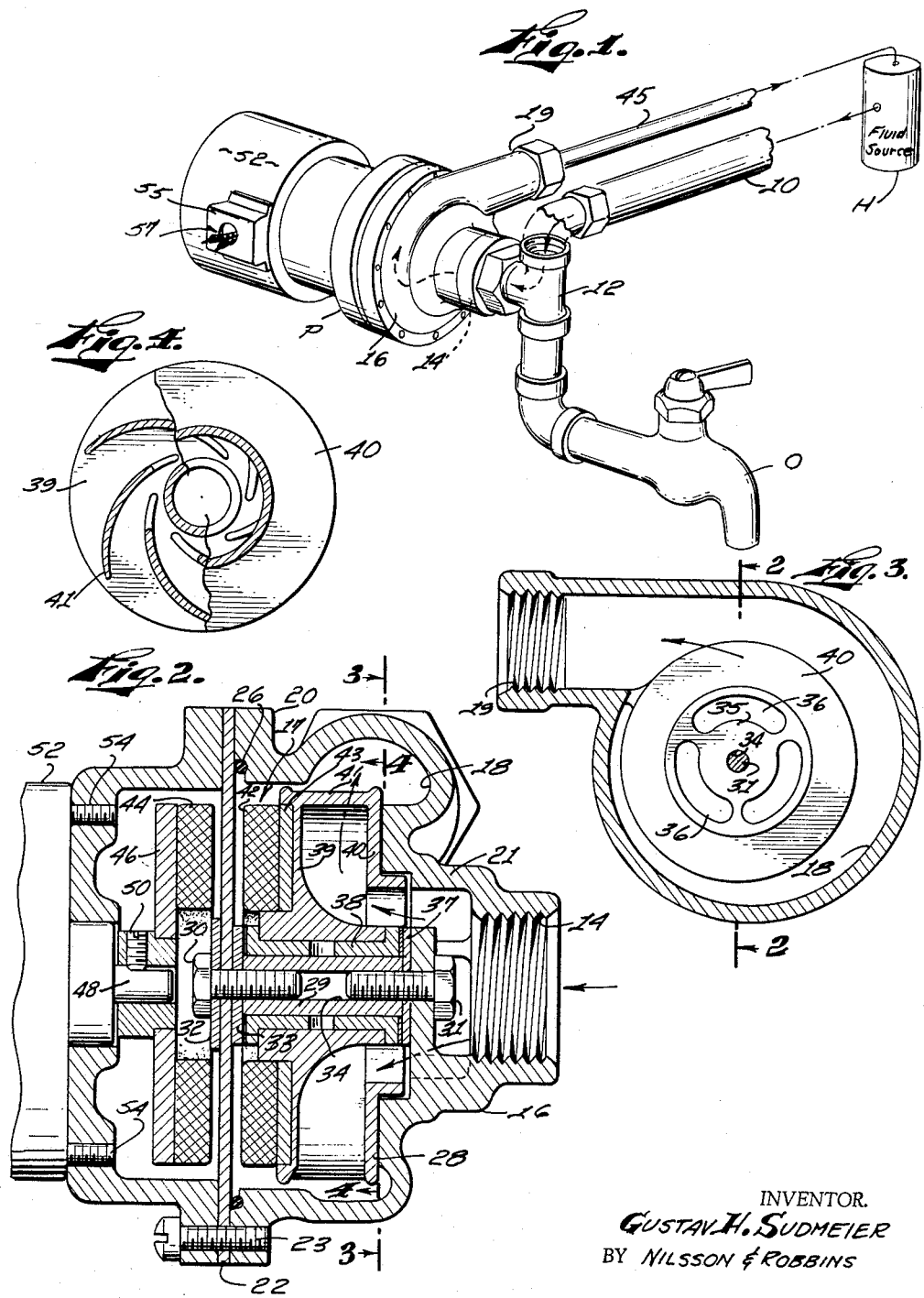
INVENTOR.
GUSTAV H. SUDMEIER
BY NILSSON & ROBBINS
ATTORNEYS United States Patent Office 3,089,514
Patented May 14, 1963

3,089,514
TEMPERATURE-STABILIZED PLUMBING SYSTEM
Gustav H. Sudmeier, 2708 Torrance Blvd., Torrance, Calif.
Filed July 12, 1961, Ser. No. 123,542
5 Claims. (Cl. 137—563)

The present invention relates to a plumbing apparatus and particularly to an apparatus for maintaining a pipe line at the temperature of a fluid that is to be intermittently carried by the line, and which fluid has a temperature different from the ambient temperature about the line.

Plumbing systems in residential and commercial buildings normally include a source of hot water which supplies outlets that are located throughout the building. Often, some of the outlets are quite remote from the hot-water source. If these outlets are infrequently used, the pipe or tubing carrying the water, cools to ambient temperature between intervals when water is drawn from the outlet. Then when a valve is opened to draw water from the outlet, considerable water must be discharged before the pipe is heated sufficiently to transport hot water. As a result, a large amount of water is wasted and the user is inconvenienced while waiting for hot water. Of course insulation of the pipe helps to maintain the temperature; however, after an extended interval without use, the line still cools. As a result, a need exists for a plumbing system which provides hot water almost instantly at outlet locations remote from the hot water-heater.

The present invention proposes maintaining the pipe line between a heater and a water valve at a desired temperature by circulating water from the heater through the pipe. However, in the past, practical pumps to circulate the fluid in this application have not been available. That is, in view of the size, cost and rate of power consumption of prior pumps, circulating the fluid to maintain the desired pipe temperature has not been entirely practical. Furthermore, for economical operation of the pump, a complex control system has been required to periodically energize the pump when the temperature of the pipe line drops below a predetermined level.

In general, the present invention comprises a system for maintaining the temperature of a pipe line, which line intermittently carries fluid having a temperature different from ambient temperature. The system includes a pump apparatus which is connected in the pipe line adjacent a valve or fluid outlet, and which continuously circulates fluid through the line returning it to the fluid source. The pump apparatus is constructed to economically operate continuously (thereby avoiding the need for complex controls) as a result of a magnetic coupling which avoids the need for a packing gland, thereby resulting in low power consumption. Furthermore, the design of the structure enables hydraulic forces to balance magnetic forces with the result of a further energy saving. Additionally, the pump apparatus has a simple structure resulting in small size, light weight, low cost, and economical maintenance.

An object of the present invention is to provide an improved plumbing system.

Another object of the present invention is to provide a pump, as for a plumbing system, which may be economically employed to maintain pipes at a desired temperature.

Another object of the present invention is to provide a pump apparatus which employs a magnetic drive structure affording economical operation and maintenance.

A further object of the present invention is to provide a fluid pump wherein hydraulic forces are balanced against magnetic coupling forces to obtain greater efficiency.

Still a further object of the present invention is to provide an economical apparatus for circulating hot fluid through a pipe line so as to maintain the pipe line at an elevated temperature, which apparatus does not require a complex control system and operates at a low power level.

These and other objects of the present invention will become apparent from a consideration of the following specification taken in conjunction with the appended drawing, wherein:

FIGURE 1 is a perspective and diagrammatic view of a system incorporating the present invention;

FIGURE 2 is a vertical sectional view along line 2—2 of FIGURE 1;

FIGURE 3 is a vertical sectional view along line 3—3 of FIGURE 2; and

FIGURE 4 is a vertical sectional view along line 4—4 of FIGURE 2.

Referring initially to FIGURE 1, there is shown a source H of fluid at a desired temperature, e.g., hot water, which source may comprise a heater or various other sources of temperature-stabilized fluid. The source H is connected to an outlet in the form of a valve O for supplying hot water. A pump apparatus P is positioned adjacent the valve O in the pipe line connecting these two units. The pump P is also connected through a return line back to the source H of hot water. In operation, the pump P functions to continuously draw water from the source H through the pipe line to maintain the temperature of the pipe line substantially at the temperature of the hot water. Therefore, hot water is immediately available from the valve O, and need not be discharged during a waste interval to obtain hot, useable water. Of course, a primary application for the system is in hot-water plumbing; however, the system may also be employed in various other plumbing, hot or cold to maintain a particular pipe line temperature.

Considering the apparatus of FIGURE 1 in greater detail, the hot-water source H is connected to the valve O through a pipe line 10 containing a T 12 which is also connected to the pump apparatus P. Specifically, the T 12 is received in a threaded axial port 14 (FIGURE 2) of a generally annular housing 16 which may be formed of cast metal, e.g., bronze or cast iron, or stainless steel. The annular housing 16 contains a gradually-enlarging channel 18 (FIGURE 3) formed about a cylindrical cavity 17. The channel 18 terminates in a tangential port 19 extending from the housing 16.

Adjacent the channel 18, the housing 16 includes an outwardly-turned annular lip 20 (FIGURE 2) which is bolted to a cup-shaped cover 21. A separator 22 is held between the housing 16 and the cover 21 by bolts 23 spaced about the lip 20. The separator 20 is non-ferrous, or non-magnetic material, e.g., epoxy resin-impregnated fiber glass. A gasket 26 lies between the lip 20 and the separator 22 to seal the housing 16 closed.

The cylindrical cavity 17 in the housing 16 contains an impeller 28 which is rotatably-mounted on a hollow shaft 29 supported on threaded studs 30 and 31. The shaft 29 may be formed of stainless steel and receives the stud 30 at an end adjacent the separator 22. The stud 30 passes through a washer 32, the separator 22 and a washer 33, then into the shaft 29.

The other end of the shaft 29 is supported by the stud 31 passing through an axial bore 34 of an upright disk 35 (FIGURE 3) integral with the housing 16. The disk 35 separates the port 19 from the cylindrical cavity 17; however, these spaces are connected by segmented opening 36 about the disk 35. The stud 31 passes through the disk 35, a washer 37, then into the shaft 29.

The shaft 29 carries bearings 38 which may be formed of carbon and are journaled into an axial bore through the impeller 28. The impeller may be variously formed of cast iron, bronze or stainless steel, and includes annular walls 39 and 40 separated by radially-extending vanes 41 (FIGURE 4).

The wall 39 of the impeller carries an annular magnet 42 on a backing plate 43. The magnet 42 may be formed of various materials as ferrite or other materials having high residual characteristics. The annular magnet may be magnetized with a pattern of radially-extending alternate north and south poles. The backing plate 43 serves to complete the magnetic circuit and may be of various magnetic materials. It is to be noted that if the impeller 28 is cast iron, the backing plate is not required.

The backing plate 43, magnet 42 and impeller 28 are fixed together as an integral unit as by epoxy resin. It is also to be noted that the entire interior of the pump may be coated with such resin if the system is to carry corrosive fluids.

The magnet 42 is flux coupled to a motor as described hereinafter, so that the motor revolves the impeller 28, urging water into the housing 16 through the port 14 and the openings 36, then about the channel 18 to leave the pump through the port 19. The port 19 is connected through a tube 45 (which may be formed of soft copper) back to the hot-water source H (FIGURE 1).

The driving apparatus for the impeller 28 will now be considered in detail. Contiguous to the separator 22, and on the opposite side from the magnet 42 is a similar magnet 44 which is affixed to a magnetic face plate 46 as by epoxy resin. The face plate 46 is affixed upon the shaft 48 of a motor 52 by a set screw 50. The motor 52 is held to the cover 20 by bolts 54, thereby positioning the magnet 36 adjacent the separator 22. A mounting bracket 55 and energizing leads 57 are provided on the motor 52.

To assemble the pump apparatus as shown, the cover 20 is first mounted on the bolts 54 extending from the motor 52. Thereafter, the driving assembly, including the magnet 44 and the face plate 46 is affixed upon the shaft 48 by the set screw 50.

In a separate operation, the impeller (carrying the magnet 36) is positioned upon the shaft 29 and the housing 16 along with the separator 22, is then mated on the cover 20 and the bolts 22 are positioned. It may therefore be seen, that the structure embodying the present invention may be very easily assembled and serviced.

To install the pump in a plumbing system, the pipe line 10 is cut off from the source H and the T 12 is inserted adjacent the water tap O. The T 12 is then fixed in the port 14 of the housing 16. Next, the tube 45 is connected between the outlet 40 and the hot-water source H. Thereafter the pipe line 10 is opened to the source H subjecting the entire system to full pressure.

In the operation of the system described herein, the motor 52 is continuously energized. Therefore, the shaft 48 continuously revolves the magnet 44 which is magnetically coupled through the separator 22 to the magnet 42. It is to be noted, that the face plate 46 acts as a magnetic back-up plate for the magnet 44, while the backing plate 43 performs a similar function with regard to the magnet 42. Therefore, magnetic coupling is established between the motor 52 and the impeller 28.

As the impeller 28 is revolved by the motor 52 through the magnetic coupling, it draws water into the housing 16 through the port 14 and expels water through the outlet port 19. In this manner, a relatively small amount of water is continuously circulated through the line 10 to maintain the temperature of the water from the source H substantially at the temperature of the water from the source H. Therefore, upon opening the valve O to draw hot water from the outlet, there is no wasteful waiting period, but hot water is immediately available.

It is to be noted, that the line 10 and the tube 45 may be insulated to reduce heat loss therefrom. In such an installation, it is necessary to circulate only a very small amount of water to maintain the temperature of the pipe line 10. However, in one model, a 1/25 horsepower motor is adequate to circulate sufficient water to maintain the desired temperature of a reasonably long pipe which is not insulated. In this regard, it is to be understood that the structure of the present invention obtains a considerable increase in efficiency by balancing hydraulic pressure against magnetic pressure to minimize friction losses.

Considering this aspect of the structure disclosed herein, reference will be made to FIGURE 2. The flux coupling between the magnets 42 and 44 tends to urge these magnets together. Therefore, the magnet 42 (along with the impeller 28) is urged toward the separator 22. However, the outlet from the pump is fed from the annular channel 18 which is open to the flat exposed surface of the magnet 42. Of course, fluid at the outlet from the pump is at a greater pressure than fluid at the inlet, to which the other surfaces of the impeller are exposed. Therefore, this pressure differential tends to urge the impeller away from the separator 22, balancing the magnetic force on the impeller and reducing friction losses.

Another important aspect of the present invention resides in the fact that no packing gland is provided in the drive unit of the pump apparatus which gland would dissipate considerable power. Therefore, the pump apparatus operates at a very low power level and can be economically continuously energized.

Another important aspect of the present invention resides in the simplicity of the structure embodying the invention. As a result of this simplicity, substantially no maintenance is required and the unit may be economically manufactured. This aspect of the invention also permits a unit embodying the invention to be small in size and flexible to a variety of mounting arrangements.

Still a further advantage of the structure of the present invention resides in the bearing support including the stud 30 and the washers 32 and 33 being mounted at the center of the separator 22. As a result, the central portion of the separator is reinforced and does not flex under substantial pressure differential. That is, the separator 22 is held against internal flexing by the rigid structure of the bearing support.

It should be noted that although both of the embodiments of the invention described herein are fully capable of providing the advantages in achieving the objects set forth, these embodiments are merely illustrative and this invention is not limited to the details of construction illustrated and described herein except as defined by the appended claims.

What is claimed is:

1. A plumbing system comprising: a source of temperature stabilized fluid; a pipe line connecting said source to an outlet location; a valve means connected to said pipe line at said outlet location; a housing including a non-magnetic section, and having intake and outlet ports, said intake port being connected to said pipe line at said outlet location; means connecting said outlet port to said source; a magnetic means rotatively supported adjacent said non-magnetic section in said housing; an impeller means affixed to said magnetic means and mounted in said housing to develop a pressure differential between said intake and outlet ports which pressure urges said magnetic means away from said non-magnetic section; and means positioned outside said housing for providing a revolving magnetic field to said magnetic means.

2. A system according to claim 1 wherein said magnetic means comprises an annular ferrite member having a high residual characteristic and a magnetic back-up plate affixed thereto.

3. A system according to claim 1 wherein said means positioned outside said housing for providing a revolving magnetic field comprises an electric motor adapted to be continuously energized, and an annular magnetic member affixed to said motor and magnetically coupled to said magnetic means.

4. A system according to claim 1 wherein said pipe line has considerably greater capacity to carry fluid than said means connecting said outlet port to said source.

5. A system according to claim 1, further including a shaft supported between said non-magnetic section of said housing, and another section of said housing whereby to rotatively support said impeller means.

References Cited in the file of this patent

UNITED STATES PATENTS

| | | |
|---|---|---|
| 2,022,481 | Schellenger | Nov. 26, 1935 |
| 2,782,721 | White | Feb. 26, 1957 |
| 2,861,364 | Klein | Nov. 25, 1958 |
| 2,970,548 | Berner | Feb. 7, 1961 |

FOREIGN PATENTS

| | | |
|---|---|---|
| 1,170,069 | France | Sept. 15, 1958 |